(12) United States Patent
Yoshikawa

(10) Patent No.: US 8,594,160 B2
(45) Date of Patent: Nov. 26, 2013

(54) RADIO TRANSMITTING/RECEIVING CIRCUIT, WIRELESS COMMUNICATION APPARATUS, AND RADIO TRANSMITTING/RECEIVING METHOD

(75) Inventor: Hiroyuki Yoshikawa, Tokyo (JP)

(73) Assignee: Panasonic Corporation, Osaka (JP)

( * ) Notice: Subject to any disclaimer, the term of this patent is extended or adjusted under 35 U.S.C. 154(b) by 48 days.

(21) Appl. No.: 13/262,063

(22) PCT Filed: Mar. 26, 2010

(86) PCT No.: PCT/JP2010/002212
§ 371 (c)(1),
(2), (4) Date: Sep. 29, 2011

(87) PCT Pub. No.: WO2010/113453
PCT Pub. Date: Oct. 7, 2010

(65) Prior Publication Data
US 2012/0020391 A1    Jan. 26, 2012

(30) Foreign Application Priority Data
Apr. 2, 2009 (JP) ................................. 2009-089902

(51) Int. Cl.
*H04B 1/44*    (2006.01)
(52) U.S. Cl.
USPC ............ 375/219; 375/295; 375/316; 455/73; 455/552; 455/88
(58) Field of Classification Search
USPC ............ 375/219, 295, 316, 371; 455/552, 73, 455/88
See application file for complete search history.

(56) References Cited

U.S. PATENT DOCUMENTS

| 4,766,434 A | * | 8/1988 | Matai et al. | ................. | 340/7.55 |
| 5,010,559 A | * | 4/1991 | O'Connor et al. | ............ | 375/368 |
| 5,396,484 A | * | 3/1995 | Itoh | ............................... | 370/204 |
| 5,537,434 A | * | 7/1996 | Persson et al. | ................ | 375/134 |
| 5,581,548 A | * | 12/1996 | Ugland et al. | ................ | 370/330 |
| 5,692,201 A | * | 11/1997 | Yato | ............................. | 713/322 |

(Continued)

FOREIGN PATENT DOCUMENTS

| JP | 2005-151535 | 6/2005 |
| JP | 2007-74423 | 3/2007 |
| JP | 2008-535334 | 8/2008 |

OTHER PUBLICATIONS

International Search Report dated May 25, 2010.

*Primary Examiner* — Daniel Washburn
*Assistant Examiner* — Berhanu Tadese
(74) *Attorney, Agent, or Firm* — Dickinson Wright PLLC

(57) ABSTRACT

A radio transmitting/receiving circuit, a wireless communication apparatus and a radio transmitting/receiving method, wherein low power consumption can be achieved without complicating software. In a control unit of the radio transmitting/receiving circuit, according to a communication system applied to a radio transmitting/receiving unit, a clock control unit selects a clock frequency; a program decoder adjusts information included in a transmission/reception program and related to the execution timing of the transmission/reception program for the radio transmitting/receiving unit; and a timing control unit controls the execution timing on the basis of the adjusted information related to the execution timing. The information related to the execution timing includes a bit sequence indicating an ON/OFF timing for the radio transmitting/receiving unit in accordance with a first communication system, and the program decoder bit-shifts the bit sequence if a second communication system is applied to the radio transmitting/receiving unit.

11 Claims, 12 Drawing Sheets

(56) References Cited

U.S. PATENT DOCUMENTS

| | | | |
|---|---|---|---|
| 5,708,684 A * | 1/1998 | Ueda | 375/358 |
| 6,243,576 B1 * | 6/2001 | Seike et al. | 455/423 |
| 6,430,417 B1 * | 8/2002 | Raith et al. | 455/466 |
| 6,466,803 B1 * | 10/2002 | Gardner | 455/553.1 |
| 6,665,692 B1 * | 12/2003 | Nieminen | 708/250 |
| 6,697,415 B1 * | 2/2004 | Mahany | 375/130 |
| 6,975,641 B1 * | 12/2005 | Kurobe et al. | 370/445 |
| 7,058,383 B2 * | 6/2006 | Sugar et al. | 455/333 |
| 7,185,244 B2 * | 2/2007 | Kojima et al. | 714/718 |
| 7,545,883 B2 * | 6/2009 | Feher | 375/299 |
| 7,796,694 B1 * | 9/2010 | O'Connor et al. | 375/242 |
| 7,937,061 B2 * | 5/2011 | Sugar et al. | 455/333 |
| 8,223,867 B2 * | 7/2012 | Schmidl et al. | 375/262 |
| 2001/0055980 A1 * | 12/2001 | Sato | 455/552 |
| 2002/0183013 A1 * | 12/2002 | Auckland et al. | 455/73 |
| 2003/0021367 A1 * | 1/2003 | Smith | 375/346 |
| 2003/0078037 A1 * | 4/2003 | Auckland et al. | 455/422 |
| 2003/0181218 A1 * | 9/2003 | Mukai et al. | 455/550.1 |
| 2003/0224749 A1 * | 12/2003 | Uozumi et al. | 455/252.1 |
| 2004/0165566 A1 * | 8/2004 | Lee et al. | 370/342 |
| 2005/0117663 A1 * | 6/2005 | Drogi et al. | 375/316 |
| 2005/0118977 A1 * | 6/2005 | Drogi et al. | 455/323 |
| 2005/0119025 A1 * | 6/2005 | Mohindra et al. | 455/552.1 |
| 2005/0201326 A1 * | 9/2005 | Lakkis | 370/329 |
| 2005/0220218 A1 * | 10/2005 | Jensen et al. | 375/302 |
| 2005/0268143 A1 * | 12/2005 | Kubo et al. | 713/600 |
| 2006/0035671 A1 * | 2/2006 | Mukai et al. | 455/557 |
| 2006/0072837 A1 * | 4/2006 | Ralston et al. | 382/232 |
| 2006/0128329 A1 * | 6/2006 | Van Rooyen | 455/180.2 |
| 2006/0256754 A1 * | 11/2006 | Liu et al. | 370/335 |
| 2007/0160179 A1 * | 7/2007 | Narathong et al. | 377/47 |
| 2008/0019303 A1 * | 1/2008 | Baek et al. | 370/328 |
| 2008/0025380 A1 * | 1/2008 | Behzad et al. | 375/216 |
| 2008/0049652 A1 * | 2/2008 | Lakkis | 370/310 |
| 2008/0207141 A1 * | 8/2008 | O'Keefe et al. | 455/91 |
| 2008/0261649 A1 * | 10/2008 | Mukai et al. | 455/552.1 |
| 2008/0307240 A1 * | 12/2008 | Dahan et al. | 713/320 |
| 2008/0310487 A1 * | 12/2008 | Hammerschmidt et al. | 375/219 |
| 2008/0310529 A1 * | 12/2008 | Futatsugi | 375/260 |
| 2008/0310552 A1 * | 12/2008 | O'Keefe et al. | 375/329 |
| 2009/0046771 A1 * | 2/2009 | Abe et al. | 375/228 |
| 2009/0104880 A1 | 4/2009 | Abe | |
| 2009/0122844 A1 * | 5/2009 | Wenzel et al. | 375/219 |
| 2009/0135972 A1 * | 5/2009 | Tanaka et al. | 375/346 |
| 2009/0227248 A1 * | 9/2009 | Chance et al. | 455/423 |
| 2009/0275357 A1 * | 11/2009 | Nakamura et al. | 455/550.1 |
| 2010/0027729 A1 * | 2/2010 | Murphy et al. | 375/371 |
| 2010/0122070 A1 * | 5/2010 | Guevorkian et al. | 712/222 |
| 2010/0135368 A1 * | 6/2010 | Mehta et al. | 375/219 |
| 2010/0216524 A1 * | 8/2010 | Thomas et al. | 455/574 |
| 2010/0290504 A1 * | 11/2010 | Torimoto et al. | 375/130 |
| 2010/0311464 A1 * | 12/2010 | Kelleher et al. | 455/552.1 |
| 2011/0142169 A1 * | 6/2011 | Kelleher et al. | 375/316 |
| 2011/0307752 A1 * | 12/2011 | Fujii et al. | 714/731 |

* cited by examiner

| | SH[2:0] | IN[7:0] | OUT[7:0] |
|---|---|---|---|
| 0-BIT SHIFT TO RIGHT | 000 | 11111100 | 11111100 |
| 1-BIT SHIFT TO RIGHT | 001 | 11111100 | 01111110 |
| 2-BIT SHIFT TO RIGHT | 010 | 11111100 | 00111111 |
| 3-BIT SHIFT TO RIGHT | 010 | 11111100 | 00011111 |
| 4-BIT SHIFT TO RIGHT | 100 | 11111100 | 00001111 |

FIG.5

| CLOCK | SHIFT AMOUNT | MAGNIFICATION |
|---|---|---|
| 416MHz | 4 BITS TO LEFT | 16 |
| 208MHz | 3 BITS TO LEFT | 8 |
| 104MHz | 2 BITS TO LEFT | 4 |
| 52MHz | 1 BIT TO LEFT | 2 |
| 26MHz | 0 | 1 |
| 13MHz | 1 BIT TO RIGHT | 1/2 |
| 6.5MHz | 2 BITS TO RIGHT | 1/4 |
| 3.25MHz | 3 BITS TO RIGHT | 1/8 |
| 1.625MHz | 4 BITS TO RIGHT | 1/16 |

FIG.6

| SH[3:0] | | IN[11:0] | SH_OUT[11:0] |
|---|---|---|---|
| 0-BIT SHIFT TO RIGHT | 0000 | 1000 1001 1000 | 1000 1001 1000 |
| 1-BIT SHIFT TO RIGHT | 0001 | 1000 1001 1000 | 0100 0100 1100 |
| 2-BIT SHIFT TO RIGHT | 0010 | 1000 1001 1000 | 0010 0010 0110 |
| 3-BIT SHIFT TO RIGHT | 0011 | 1000 1001 1000 | 0001 0001 0011 |
| 4-BIT SHIFT TO RIGHT | 0100 | 1000 1001 1000 | 0000 1000 1000 |
| 5-BIT SHIFT TO RIGHT | 0101 | 1000 1001 1000 | 0000 0100 0100 |
| 6-BIT SHIFT TO RIGHT | 0110 | 1000 1001 1000 | 0000 0010 0010 |
| 7-BIT SHIFT TO RIGHT | 0111 | 1000 1001 1000 | 0000 0001 0001 |
| 8-BIT SHIFT TO RIGHT | 1000 | 1000 1001 1000 | 0000 0000 1000 |
| 9-BIT SHIFT TO RIGHT | 1001 | 1000 1001 1000 | 0000 0000 0100 |

COUNTER VALUE AFTER CONVERSION = [0000 0010 0010] + [0000 0001 0001] + [0000 0000 0100]
= [0000 0011 0111]

| | SH[2:0] | IN[8:0] | OUT[8:0] |
|---|---|---|---|
| 0-BIT SHIFT TO RIGHT | 000 | 1 1111 1000 | 1 1111 1000 |
| 1-BIT SHIFT TO RIGHT | 001 | 1 1111 1000 | 0 1111 1100 |
| 2-BIT SHIFT TO RIGHT | 010 | 1 1111 1000 | 0 0111 1110 |
| 3-BIT SHIFT TO RIGHT | 011 | 1 1111 1000 | 0 0011 1111 |

RADIO TRANSMITTING/RECEIVING CIRCUIT, WIRELESS COMMUNICATION APPARATUS, AND RADIO TRANSMITTING/RECEIVING METHOD

TECHNICAL FIELD

The present invention relates to a radio transmitting/receiving circuit, radio communication apparatus, and radio transmitting/receiving method.

BACKGROUND ART

A configuration shown in patent literature 1 is known as the basic configuration of a radio communication apparatus of, for example, is a mobile telephone. Thus, a radio section, that performs radio transmitting process and radio receiving process in a radio communication apparatus, is mainly formed by a radio IC (which is a high frequency modem and a unified AFE in patent literature 1). Basically, the control of a radio IC is all performed by a baseband IC (which is a DSP and CPU unified chip in patent literature 1).

Specifically, a baseband IC controls transmission/reception timing in a radio IC and a process of transmission/reception data, according to a communication scheme (for example, GSM and UMTS) applied to a radio communication apparatus.

After receiving control signals from a baseband IC, a radio IC converts these to control signals which respectively suit multiple function sections provided in a radio IC, and controls each function section using the acquired signals. This control process in a radio IC is controlled by a control section provided in a radio IC.

According to the above configuration, since a baseband IC controls all radio ICs, the number of types of control signals which are transmitted and received between a baseband IC and a radio IC increase, and as a result, the process between a baseband IC and a radio IC becomes complex. When the above radio communication apparatus has a configuration supports multiple communication schemes, the process between a baseband IC and a radio IC becomes further complex. Thus, control signal lines connected from a baseband IC to a radio IC need to be divided for each communication scheme. Thus, the numbers of LSI terminals is required to increase, so that the size of the LSI package becomes large, which makes it difficult to reduce the cost of a radio communication apparatus and the power consumption.

To suppress the amount of process between a baseband IC and a radio IC, as shown in patent literature 2, a second radio communication apparatus where a radio IC is independently controlled by software has been proposed. With the second radio communication apparatus, a radio IC has a control section having a sequencer function that enables individual control of a radio IC by switching software, and a memory that stores the software. In patent literature 2, the sequencer function is subject to "state machine controller" and the memory is subject to "storage unit."

According to the configuration of the above second radio communication apparatus, a radio IC can be individually controlled by software, so that it is possible to simplify a control of a baseband IC to the radio IC, and to reduce the numbers of interfaces (that is, terminals) between a baseband IC and a radio IC.

A standardization (DigRF) has been promoted where with a standard of 2G/2.5G GSM terminal and a standard of 3G terminal, a baseband IC and a radio IC are connected by further reducing the numbers of signal lines and by realizing faster digital interface (LVDS). Here, a baseband IC and a radio IC are connected by eight signal lines for transmitting and receiving transmission/reception data and control signals, which realizes an efficient digital connection.

CITATION LIST

Patent Literature

PTL1
Japanese Patent Application Laid-Open No. 2005-151535
PTL2
U.S. Patent Application Publication No. 2008/0207141

SUMMARY OF INVENTION

Technical Problem

However, even if individual control of a radio IC is possible as with the above second radio communication apparatus, there is a following problem when multiple communication schemes of different transmission rates are applied. When the above multiple communication schemes all use a common operation clock, the clock frequency used in the communication scheme of the fastest transmission rate will be used in all communication schemes. Thus, a communication scheme with a slow transmission rate has to use an operation clock of a communication scheme with a fast transmission rate resulting in a problem that a consumption power will increase when a communication scheme with a slow transmission rate is applied.

Meanwhile, if an operation clock is switched for each communication scheme, there is a problem that separate software programs need to be prepared for each operation clock and the software program will be complicated.

Although the above standardization provides for a rule that a physical signal line and a format are prescribed, there is no provision that a baseband IC controls a radio IC.

It is therefore an object of the present invention to provide a radio transmitting/receiving circuit, radio communication apparatus, and radio transmitting/receiving method that can reduce power consumption without complicating software, when multiple communication schemes are applied.

Solution to Problem

The radio transmitting/receiving circuit according to one aspect of the present invention, formed to be able to transmit and receive in a plurality of communication schemes and transmitting and receiving a radio signal using one transmitting/receiving program that is common among the a plurality of communication schemes, the circuit employs a configuration having: a radio transmitting/receiving section; and a control section comprising: a clock control section that switches a clock frequency according to a communication scheme applied to the radio transmitting/receiving section; an adjustment section that adjusts information, which is related to executing timing of the transmitting/receiving program of radio transmitting/receiving section and which is included in the transmitting/receiving program, according to the communication scheme applied to the radio transmitting/receiving section; and a timing control section that controls executing timing of the transmitting/receiving program based on the switched clock frequency and the information about the adjusted executing timing.

The radio communication apparatus according to one aspect of the present invention includes: the above described radio transmitting/receiving circuit; and a baseband process circuit that outputs a transmitting baseband signal to the radio transmitting/receiving circuit and receives a receiving baseband signal from the radio transmitting/receiving circuit.

The radio transmitting/receiving method according to one aspect of the present invention to transmit and receive a radio signal using one transmitting/receiving program that is common among a plurality of communication schemes, switching a clock frequency according to a communication scheme applied to a radio transmitting/receiving section; adjusting information, which is related to executing timing of the transmitting/receiving program of the radio transmitting/receiving section and which is included in the transmitting/receiving program, according to the communication scheme applied to the radio transmitting/receiving section; and controlling the executing timing of the transmitting/receiving program based on the switched clock frequency and the information about the adjusted executing timing.

Advantageous Effects of Invention

The present invention provides a radio transmitting/receiving circuit, radio communication apparatus, and radio transmitting/receiving method that can reduce power consumption without complicating software, when multiple communication schemes are applied.

BRIEF DESCRIPTION OF THE DRAWINGS

FIG. 5 explains a bit-shifting process in a program decoder;

FIG. 6 shows other example of a bit-shifting process;

FIG. 10 explains a bit-shifting process in a program decoder;

FIG. 12 explains a bit-shifting process in a program decoder.

DESCRIPTION OF EMBODIMENTS

Figure 1:
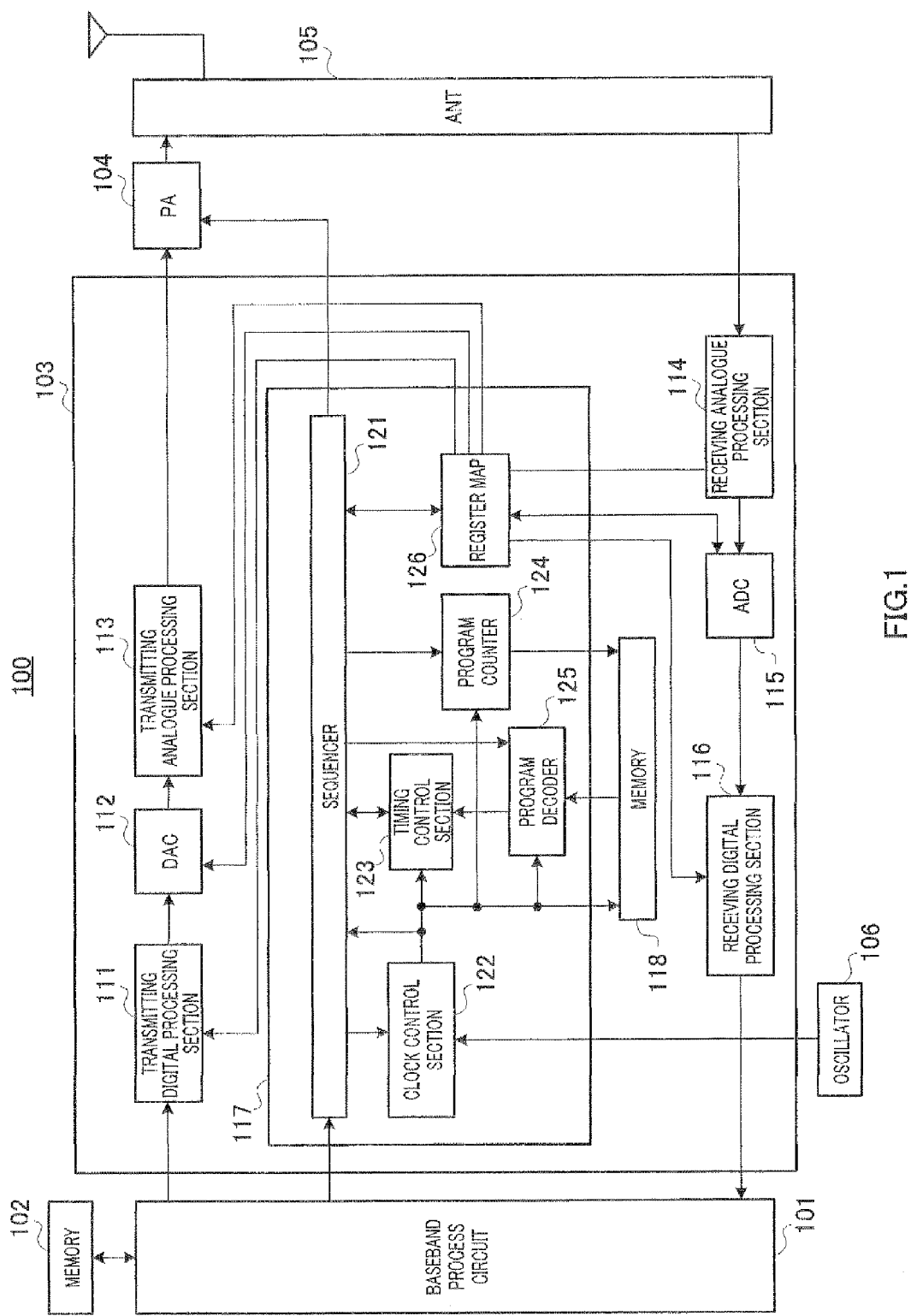
FIG. 1 is a block diagram showing a configuration of a radio communication apparatus according to embodiment 1 of the present invention.

Now, an embodiment of the present invention will be explained in detail with reference to the accompanying drawings. Here, in embodiments, the same components will be assigned the same reference numerals and their explanations will be omitted.

Embodiment 1

FIG. 1 is a block diagram showing a configuration of base station 100 according to embodiment 1 of the present invention. In FIG. 1, radio communication apparatus 100 has baseband process circuit 101, memory 102, radio transmitting/receiving circuit 103, power amplifier (PA) 104, antenna 105, and oscillator 106.

Baseband process circuit 101 builds in CPU and DSP. Based on setting data for transmission/reception stored in memory 102, baseband process circuit 101 controls timing to output transmitting baseband signals to radio transmitting/receiving circuit 103, and timing to receive receiving baseband signals from radio transmitting/receiving circuit 103. Thus, baseband process circuit 101 controls transmitting timing and receiving timing.

Memory 102 memorizes setting data for transmission/reception.

Radio transmitting/receiving circuit 103 has transmitting digital processing section 111, digital-to-analog conversion section (DAC) 112, transmitting analogue processing section 113, receiving analogue processing section 114, analog-to-digital conversion section (ADC) 115, receiving digital processing section 116, control section 117, and memory 118.

Transmitting digital processing section 111 digitally modulates transmitting baseband signal that are output from baseband process circuit 101 by a modulation scheme (such as, BPSK, QPSK, 16QAM, and 64QAM) that suits a communication scheme, and outputs the acquired digital modulation signals to digital-to-analog conversion section 112.

Digital-to-analog conversion section 112 performs digital-to-analog conversion to digital modulation signals that are received from transmitting digital processing section 111, and outputs the acquired analogue modulation signals to transmitting analogue processing section 113.

Transmitting analogue processing section 113 up-converts analogue modulation signals that are received from digital-to-analog conversion section 112, and outputs the acquired radio signals to PA 104. Radio signals output from transmitting analogue processing section 113 are amplified in PA 104, and then transmitted through antenna 105.

Receiving analogue processing section 114 down-converts radio signals received through antenna 105, and outputs the acquired analog signals to analog-to-digital conversion section 115.

Analog-to-digital conversion section 115 performs analog-to-digital conversion to analog signals received from receiving analogue processing section 114, and outputs the acquired digital signals to receiving digital processing section 116.

Receiving digital processing section 116 digitally demodulates digital signals received from analog-to-digital conversion section 115, and outputs the acquired receiving baseband signals to baseband process circuit 101.

The above described transmitting digital processing section 111, digital-to-analog conversion section 112, transmitting analogue processing section 113, receiving analogue processing section 114, analog-to-digital conversion section 115, and receiving digital processing section 116 forms a radio transmitting/receiving section.

Control section 117 controls the above radio transmitting/receiving section by operating a transmitting/receiving program based on control signals received from baseband process circuit 101. Specifically, control section 117 controls executing timing of the radio transmitting/receiving section of the transmitting/receiving program, based on information about executing timing included in the transmitting/receiving program. Furthermore, control section 117 adjusts the executing timing of the radio transmitting/receiving section of the transmitting/receiving program, according to a communication scheme applied to radio transmitting/receiving section.

Specifically, control section 117 has sequencer 121, clock control section 122, timing control section 123, program counter 124, program decoder 125, and register MAP 126.

Sequencer 121 outputs control signals through register MAP 126 that is a function to keep control signals for function blocks other than control section 117 that radio transmitting/receiving circuit 103 has. Sequencer 121 directly outputs control signals to each function block that control section 117 has. In this control signal, the identification information of a communication scheme applied to a radio transmitting/receiving section is included. Sequencer 121 controls voltage to apply to PA 104. By this means, radio signals output from transmitting analogue processing section 113 are amplified in PA 104 according to applied voltage, and after that are transmitted through antenna 105.

Clock control section 122 forms operation clock signals that suit a communication scheme applied to a radio reception section, by using the reference signal received from oscillator 106. The formed operation clock signal is output to sequencer 121, timing control section 123, program counter 124, and program decoder 125.

Program decoder 125 decodes a program output from memory 118, and outputs the decoded program to timing control section 123. For example, program decoder 125 adjusts executing timing of a radio transmitting/receiving section of a transmitting/receiving program, according to a communication scheme applied to a radio transmitting/receiving section. Specifically, program decoder 125 adjusts executing timing as below. A transmitting/receiving program includes information about executing timing. This information about executing timing includes a bit stream that indicates on/off timing of a radio transmitting/receiving section according to the first communication scheme. Program decoder 125 performs a bit-shifting process to the bit stream when a radio transmitting/receiving section adopts a second communication scheme that is different from the first communication scheme. Thus, program decoder 125 functions as an information conversion process means that converts information about executing timing written in the program suited for the first communication scheme, to information suited for a second communication scheme.

Figure 2:
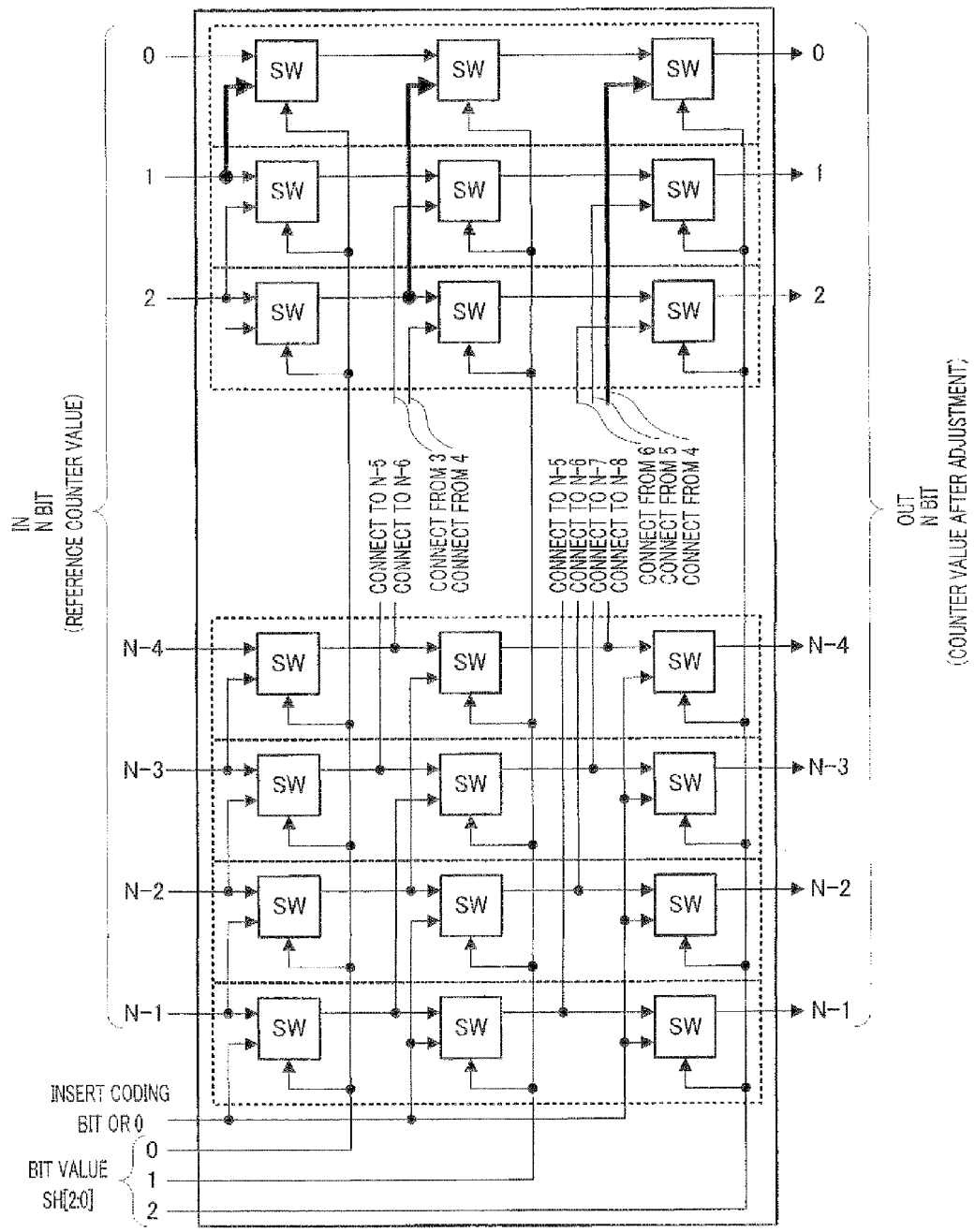
FIG. 2 is a block diagram showing a configuration of a bit-shifting circuit.

Program decoder 125 includes a bit-shifting circuit. FIG. 2 is a block diagram showing a configuration of a bit-shifting circuit. FIG. 2 shows especially a bit-shifting circuit to bit-shift to the right. In FIG. 2, a bit-shifting circuit is formed by N×3 switches. In FIG. 2, constituent bits forming an input bit stream are input to terminals 0~N−1 respectively. In terminal 0, the rightmost constituent bit of an input bit stream is input, and in terminal N−1, the leftmost constituent bit of an input bit stream is input.

Terminal 0~2 shown in the lower part of FIG. 2 show the terminals to which configuration bits of bit-shifting value are input individually. In terminal 0, the rightmost constituent bit of a bit-shifting value is input, and in terminal 2, the leftmost constituent bit of a bit-shifting value is input. Thus, to input bit value 1 in terminal 0 is a 1-bit shift, to input bit value 1 in terminal 1 is a 2-bit shift, and to input bit value 1 in terminal 2 is a 4-bit shift. Thus, the switch group in the first row of a bit-shifting circuit (which is a switch group in the left side of FIG. 2) performs bit-shifting process that suits an input bit value of terminal 0. The switch group in the second row performs bit-shifting process that suits an input bit value of terminal 1. The switch group in the third row performs bit-shifting process that suits an input bit value of terminal 2. Thus, with the switch group of the first row, an input of lower terminal of each switch and an input of the upper terminal of an adjacent switch are the same. This is because the amount of bit-shifting in the first row switch group is one bit. For the same reason, with the switch group of the second row, an input of lower terminal of each switch is the same as the input of upper terminal of the switch that is two switches apart. With the switch group of the third row, an input of lower terminal of each switch is the same as the input of upper terminal of the switch that is four switches apart.

Thus, when bit value 1 is input to multiple terminals, the total amount of shift is the sum of the above described amounts of shift.

Timing control section 123 has a timer function and controls executing timing of a radio transmitting/receiving section of a transmitting/receiving program, based on information about executing timing included in a transmitting/receiving program that is received from memory 118 through program decoder 125. Information about executing timing is converted to information that suits a communication scheme in program decoder 125, so that timing control section 123 can uniformly control executing timing regardless of communication schemes, based on information about executing timing that is written in the program received from program decoder 125.

Program counter 124 outputs the following programs in order from memory 118 according to executing condition of a program in sequencer 121. By this means, the process program is performed in order.

Register MAP 126 outputs control signals received from sequencer 121 to each function block.

Memory 118 stores a program.

Power amplifier (PA) 104 amplifies a transmitting radio signal at an amplification factor that suits the voltage that is applied by sequencer 121.

Oscillator 106 oscillates the reference signal and outputs it to clock control section 122. Oscillator 106 is, for example, TCXO (Temperature Compensated Crystal Oscillator).

Figure 3:
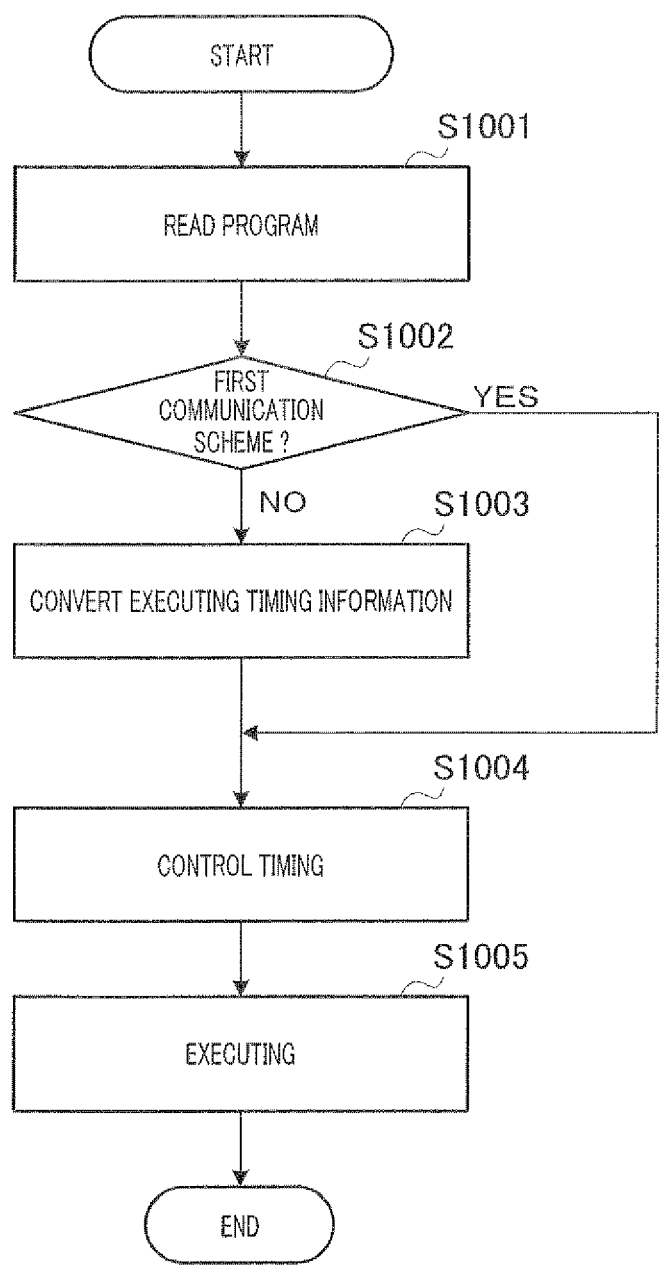
FIG. 3 is a flow diagram to explain operations of a radio transmitting/receiving circuit.

An operation of radio transmitting/receiving circuit 103 having the above configuration will be described. FIG. 3 is a flow diagram showing operations of radio transmitting/receiving circuit 103.

In the control program (that is, a transmitting/receiving program) stored in memory 118, the program is written to control on/off of each function block (that is, transmitting digital processing section 111, digital-to-analog conversion section 112, transmitting analogue processing section 113, receiving analogue processing section 114, analog-to-digital conversion section 115, and receiving digital processing section 116) that forms a radio transmitting/receiving section. Sequencer 121 writes on/off control information for each function block in register MAP 126 based on this control program, and by this means, controls each function block on and off. The on/off control information is, for example, information formed by one bit, where bit value 1 is on control and bit value 0 is off control.

To perform this kind of control, program decoder 125 reads a transmitting/receiving program in step S1001 from memory 118.

Program decoder 125 identifies whether or not the communication scheme applied to a radio transmitting/receiving section in step S1002 is the first communication scheme. Here, parameters related to a transmission executing timing in a transmitting/receiving program are written to suit the first communication scheme.

If as a result of determination in step S1002 the second communication scheme, which is different from the first communication scheme, is identified (step S1002: NO), program decoder 125 converts parameters about transmission executing timing to suit the second communication scheme (step S1003).

On the other hand, if as a result of determination in step S1002, the first communication scheme is identified (step S1002:YES), the conversion process of the parameters about transmission executing timing is not performed.

In step S1004, timing control section 123 receives a program from program decoder 125, and controls executing timing based on information about transmission executing timing written in this program. Here, if the second communication scheme is identified, information conversion process is performed in step S1003, timing control section 123 controls executing timing based on information about the converted executing timing. Specifically, timing control section 123 outputs the program to sequencer 121 after a count value expires.

In step S1005, sequencer 121 performs the program received from timing control section 123. Thus, sequencer 121 outputs the control signal to each function block through register MAP 126.

Figure 4:
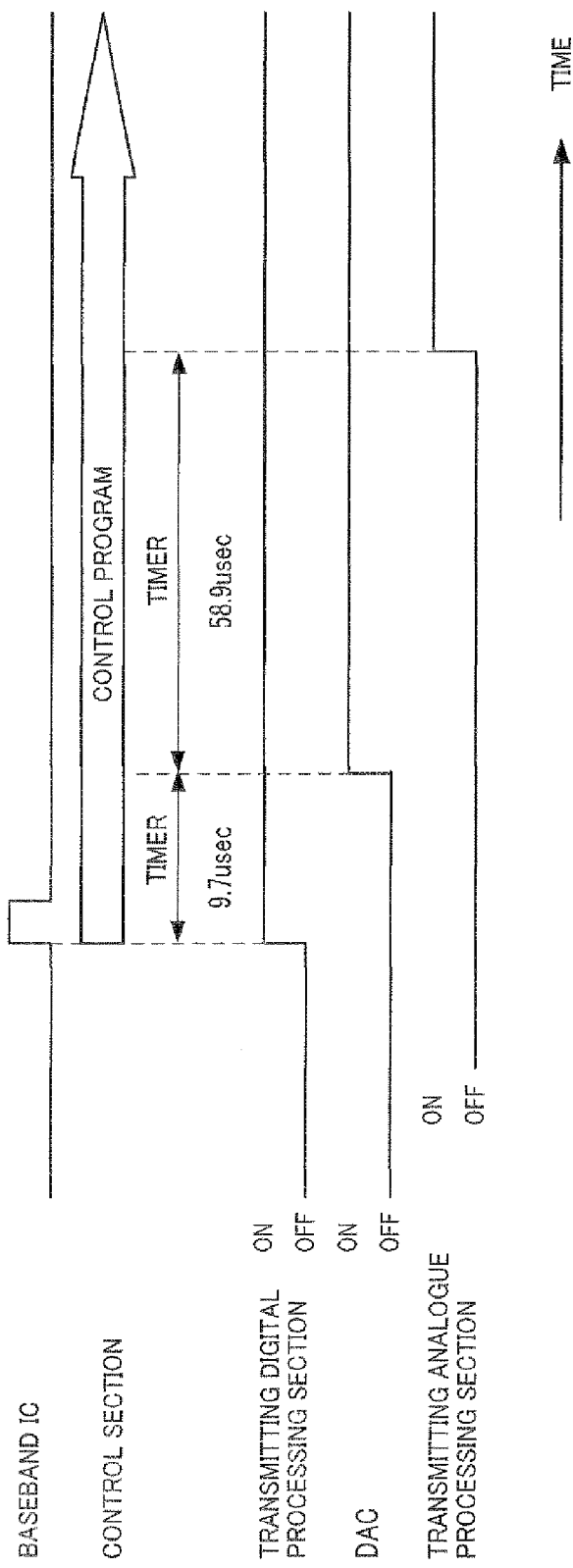
FIG. 4 shows a radio transmitting timing designed for a radio communication apparatus targets.

Next, operations of program decoder 125 will be described in further detail. FIG. 4 is a diagram showing a radio transmitting timing designed for radio communication apparatus 100. In this case, assume that UMTS which is the first communication scheme of a high transmission rate, and GSM which is a second communication scheme. The operation clock frequency is 26 MHz if a communication scheme adopts UMTS, or 6.5 MHz if a communication scheme adopts GSM, The executing timing information written in a program is written to suit UMTS, that is the first communication scheme. A time interval from on timing of transmitting digital processing section 111 to on timing of DAC 112 and a time interval from on timing of DAC 112 to on timing of transmitting analogue processing section 113 which are defined as executing timing information here, are 9.7 usec and 58.9 usec respectively. Thus, to assume the above intervals, when the operation clock frequency is 6.5 MHz, counter value 252 (hexadecimal: FC) and counter value 1532 are written in the program.

When reading this program, program decoder 125 identifies the communication scheme applied to a radio transmitting/receiving section, and bit-shifts the both counter values when the second communication scheme is applied. Thus, counter value 252 (hexadecimal: FC) is shifted 2 bits to the right, and converted into counter value 63 (hexadecimal: 3F). When using counter value 63 in GSM where the operation clock frequency is 6.5 MHz, the time interval from on timing of transmitting digital processing section 111 to on timing of DAC 112 becomes 9.7 usec, as with UMTS.

FIG. 5 is a diagram showing the bit-shifting process in program decoder 125. In FIG. 5, SH [2:0] indicates a bit-shifting value, IN [7:0] indicates a counter value (in this case, 252), and OUT [7:0] indicates the converted counter value. In the above example, a bit-shifting circuit receives a bit-shifting value [010] and a counter value [11111100] as an input and outputs [00111111] as the hit-shifted counter value.

Here, as a method to suit the above time intervals of the first communication scheme and the second communication scheme, the following method is also possible. Thus, this is a method of preparing in memory 118 a program (counter values 63 and 383) for the second communication scheme other than a program (counter values 252 and 1532) for the first communication scheme, and reading a program suits the communication scheme applied to a radio transmitting/receiving section by timing control section 123. However, in this method, a program needs to be separately prepared for each operation clock, which makes the quantity of programs increase and the management of the programs complex.

On the other hand, with the present invention, a programmed data is changed (by bit-shifting, for example) according to a communication scheme and, at the same time, an operation clock is changed, so that it is possible to realize the same time setting by using the same program regardless of a communication scheme. Thus, in a communication device which employs multiple communication schemes, there has been a problem that, when a communication scheme simply switches a clock, configuration of software is required to be prepared for each operation clock, which makes the quantity of software increase and complex at the same time, but in the configuration of the present invention, radio transmitting/receiving circuit 103 that can reduce power consumption without making software complex is possible.

As described above, with control section 117 of radio transmitting/receiving circuit 103 of the present embodiment, program decoder 125 adjusts information, which is related to executing timing of a transmitting/receiving program for a radio transmitting/receiving section and which is included in the transmitting/receiving program, according to the communication scheme applied to a radio transmitting/receiving section, clock control section 122 adjusts a clock at the same time and, based on the information about the executing timing after this adjustment, timing control section 123 controls the executing timing.

Specifically, information about executing timing includes a bit stream showing on/off timing of a radio transmitting/receiving section that suit the first communication scheme, and, when a second communication scheme different from the first communication scheme is applied to a radio transmitting/receiving section, program decoder 125 bit-shifts the above bit stream and clock control section 122 converts an operation clock at the same time.

By this means, to apply multiple communication schemes, it is possible to provide radio transmitting/receiving circuit 103 that can reduce power consumption without making software complex. Although with the present embodiment two modulation schemes of UMTS and GSM have been described by way of example, it is equally possible to realize the same configuration with other multiple communication schemes.

As shown in FIG. 6, a bit-shift process is not limited to a bit-shift to the right, but a bit-shift to the left is also possible. In FIG. 6, 26 MHz is defined as the reference operation clock frequency. Thus, in this case, in a transmitting/receiving program, a counter value which suits the reference operation frequency, 26 MHz, is written. Program decoder 125 converts a counter value by a bit-shifting value that suits the frequency of the operation clock that is actually used. By this means, in either case of an operation clock of a higher frequency than the reference operation frequency and an operation clock of a lower frequency, the same setting time can be realized in the same program.

Figure 7:
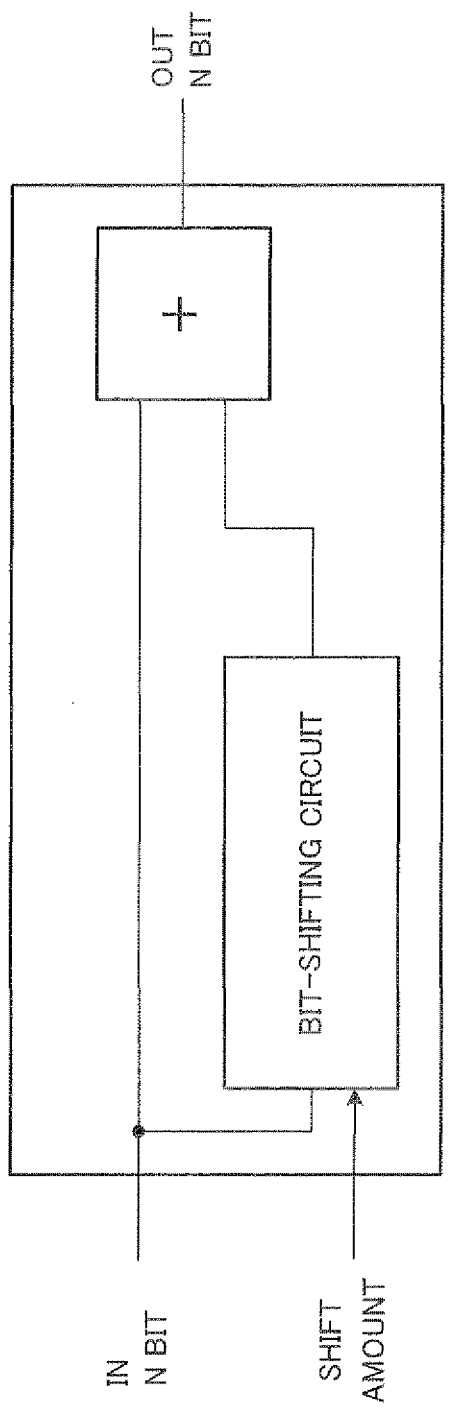
FIG. 7 shows a configuration example that combines a bit-shifting process and an adding process.

However, if only, as shown in FIG. 6 with bit-shifting shown alone, it is not possible to realize the same setting time as the frequency of other operation clocks, for example, by the operation clock of 78 MHz. In this case, it is possible to combine a bit-shifting process and an adding process. FIG. 7 is a diagram showing a configuration example to combine a bit-shifting process and an adding process. According to this configuration, by shifting 1-bit to the left in a bit-shifting circuit, it is possible to acquire a counter value which suits the operation clock of 78 MHz. Thus, by acquiring a counter value that suits 52 MHz by shifting 1 bit to the left, and by adding a counter value that suits the reference operation frequency 26 MHz to that counter value, it is possible to acquire the counter value that suits the operation clock of 78 MHz.

Embodiment 2

Embodiment 2 is a specific configuration where a bit-shifting process and an adding process are performed in a process to convert information about the executing timing written in the program.

The basic configuration of a radio communication apparatus according to embodiment 2 is the same as of radio communication apparatus 100 according to embodiment 1, and will be explained quoting FIG. 1.

Program decoder 125 according to embodiment 2 includes information conversion section 201. Information conversion section 201 receives as input a counter value (that is, a bit stream formed by N bit) supports the reference communication scheme, shift information including three amounts of shift, and a selected signal. Here, shift information is memorized in program decoder 125 for every combination of the reference communication scheme and the communication scheme that is actually provided. The counter value supports the reference communication scheme is the counter value written in the program.

While bit-shifting the counter value with three amounts of shift, information conversion section 201 selects the three results calculated by bit-shifting and the input counter value based on the selected signal, and add up them. The acquired result of adding is output as the counter value after conversion (that is, a bit stream formed by N bit).

Figure 8:
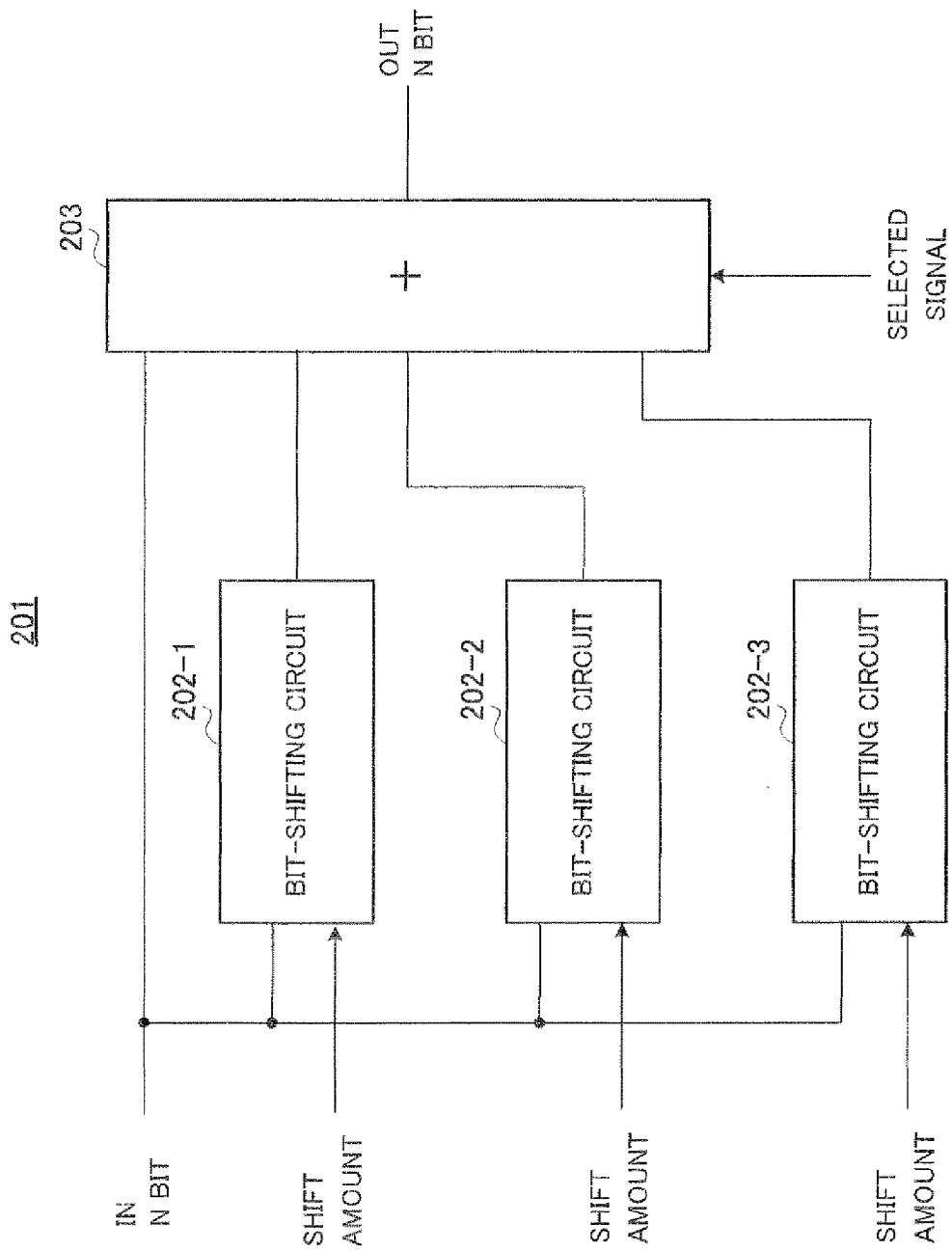
FIG. 8 is a block diagram showing a configuration of an information conversion section according to embodiment 2 of the present invention.

FIG. 8 is a block diagram showing a configuration of information conversion section 201. In FIG. 8, information conversion section 201 has bit-shifting circuits 202-1~3 and adding process section 203.

Bit-shifting circuit 202 receives as input a counter value supports the reference communication scheme and one amount of shift, and applies a bit shift to equal to the amount of shift to the input counter value. The acquired result is output to adding process section 203.

Adding process section 203 selects ones that corresponds to the reference communication scheme and ones that correspond to selected signals from the results of bit-shifting received from each bit-shifting circuit 202, and adds up the selected items.

Figure 9:
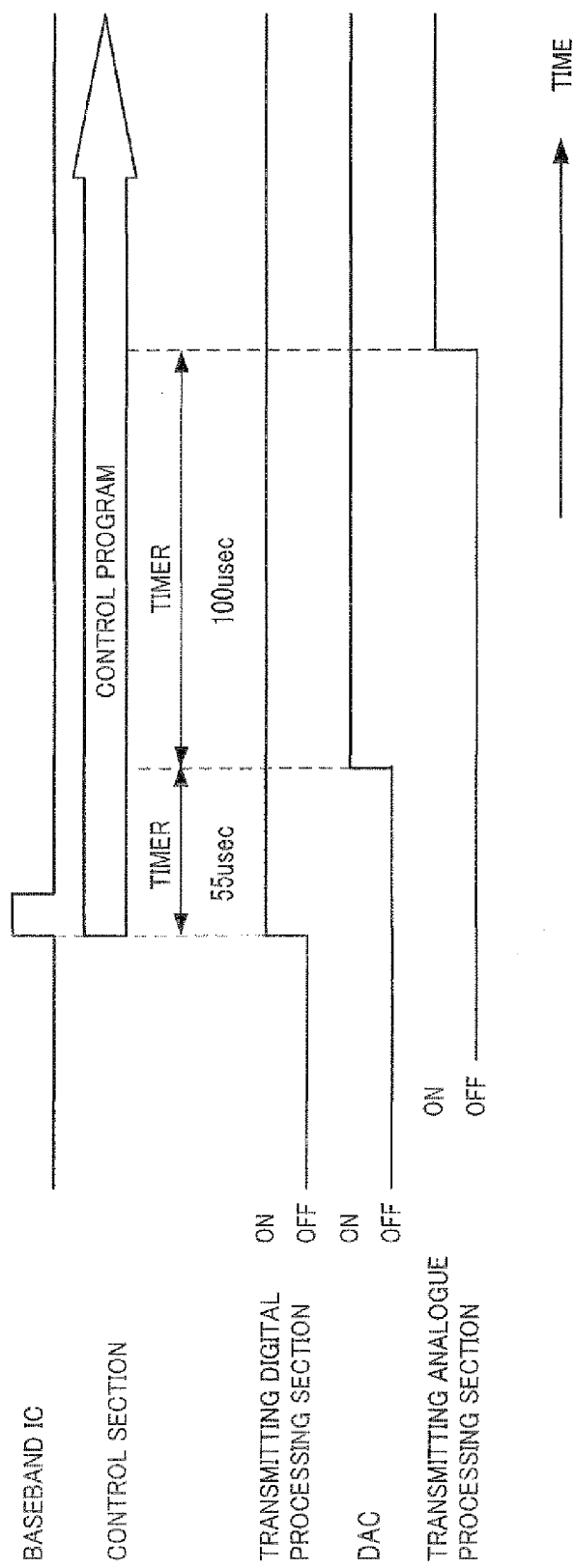
FIG. 9 shows a radio transmitting timing designed for a radio communication apparatus targets.

An operation of a radio communication apparatus having the above configuration will be described. Here, 802.11a and Bluetooth that are used in a wireless LAN and a short-range communication system are treated as examples. Thus, in this case, the first communication scheme is subject to 802.11a which is a communication scheme of a high transmission rate, and a second communication scheme is subject to Bluetooth. The operation clock frequency is 40 MHz if a communication scheme adopts 802.11a, or 1 MHz if a communication scheme adopts Bluetooth. The executing timing information written in the program is written to suit 802.11a that is the first communication scheme. A time interval from on timing of transmitting digital processing section 111 to on timing of DAC 112 and a time interval from on timing of DAC 112 to on timing of transmitting analogue processing section 113 which are defined as executing timing information here, are, for example, as shown in FIG. 9, 55 usec and 100 usec respectively. Thus, to assume the above intervals, when the operation clock frequency is 40 MHz, counter value 2200 (hexadecimal: 898) and counter value 4000 (hexadecimal: FAO) are written in the program.

When reading this program, program decoder 125 determines which communication scheme is applied to a radio transmitting/receiving section, and if the second communication scheme is applied, a counter value after conversion is calculated by performing a bit-shifting process and an adding process to the counter value written in the transmitting/receiving program.

Specifically, program decoder 125 stores three shift values, such as, a 6-bit right shift, a 7-bit right shift, and a 9-bit right shift as shift information. Program decoder 125 performs a bit-shifting process to input counter value 2200 based on the above shift information. Program decoder 125 selects the results of three-bit shift and adds these as well, based on a selected signal (which in this case indicates to select the result of three-bit shift except the input counter value). By this means, counter value 2200 (hexadecimal: 898) is converted to counter value 55 (hexadecimal: 37) by adding the result of shifting 6 bits to the right, the result of shifting 7 bits to the right, and the result of shifting 9 bits to the right. When using counter value 55 in Bluetooth having the operation clock frequency of 1 MHz, the time interval from on timing of transmitting digital processing section 111 to on timing of DAC 112 becomes 55 usec.

FIG. 10 is a diagram to explain a bit-shifting process in program decoder 125. In FIG. 10, SH [3:0] shows a bit-shifting value, IN [11:0] shows a counter value (in this case, 2200), and SH_OUT [11:0] shows the value after bit-shifting. In the present embodiment, to change the operation clock from 40 MHz to 1 MHz, program decoder 125 memorizes the shift information formed by bit-shifting values [0111], and [1001] (which in decimal mean 6 bits, 7 bits, and 9 bits respectively). First, information conversion section 201 bit-shifts counter values [1000 1001 1000] (which is 2200 in decimal) by bit-shift values [0110], [0111], and [1001] respectively. Each acquired value after bit-shifting as above is [0000 0010 0010], [0000 0001 0001], and [0000 0000 0100]. These are written in binary, and when in decimal, these are 34, 17, and 4, respectively. Information conversion section 201 acquires the counter value after conversion [0000 0011 0111] by adding the values after bit-shifting [0000 0010 0010], [0000 0001 0001], and [0000 0000 0100]. In decimal, this is 55. As obvious from FIG. 10, for example, the process to shift six bits to the right is to remove six bits from the right side of a bit stream and to add zero equal to six bits to the left side of the bit stream at once. Meanwhile, a 6-bit shift to the left means to remove six bits from the left side of the bit stream and to add zero equal to six bits to the right of the bit stream at once.

Here, as a method to suit the above time intervals of the first communication scheme and the second communication scheme, the following method is also possible. Thus, this is a method of preparing in memory 118 a program (counter value 55) for the second communication scheme other than a program (counter value 2200) for the first communication scheme, and reading a program that suits the communication scheme applied to a radio transmitting/receiving section by timing control section 123. However, in this method, a program needs to be separately prepared for each operation clock, which makes the quantity of programs increase and the management of the programs complex.

On the other hand, with the present invention, a programmed data is changed (for example, by bit-shifting and adding) according to a communication scheme and, at the same time, an operation clock is changed, so that it is possible to realize the same time setting by using the same program regardless of a communication scheme. Thus, in a communication device which employs multiple communication schemes, there has been a problem that, when a communication scheme simply switches a clock, configuration of software is required to be prepared for each operation clock, which makes the quantity of software increase and complex at the same time, but in the configuration of the present invention, radio transmitting/receiving circuit 130 that can reduce power consumption without making software complex is possible.

Although in the above explanation one bit-shifting circuit 202 is provided for each amount of shift that is included in shift information, the present invention is not limited to this, and it is equally possible to provide only one bit-shifting circuit 202. In this case, multiple amounts of shift are input to bit-shifting circuit 202 by changing timing respectively. Adding process section 203 performs an adding process at the timing when the shifting result associated with all amounts of shift is collected.

Although in the above description a case has been explained where 802.11a and Bluetooth are examples of the first communication scheme and the second communication scheme, the present invention is not limited to this, it is possible to apply to other combination.

Embodiment 3

In embodiment 1 two communication schemes are applied to radio communication apparatus 100. On the other hand, in embodiment 3, three communication schemes are applied to a radio communication apparatus. A case will be described quoting FIG. 1 because the basic configuration of a radio communication apparatus according to embodiment 3 is common to radio communication apparatus 100 according to embodiment 1.

Figure 11:
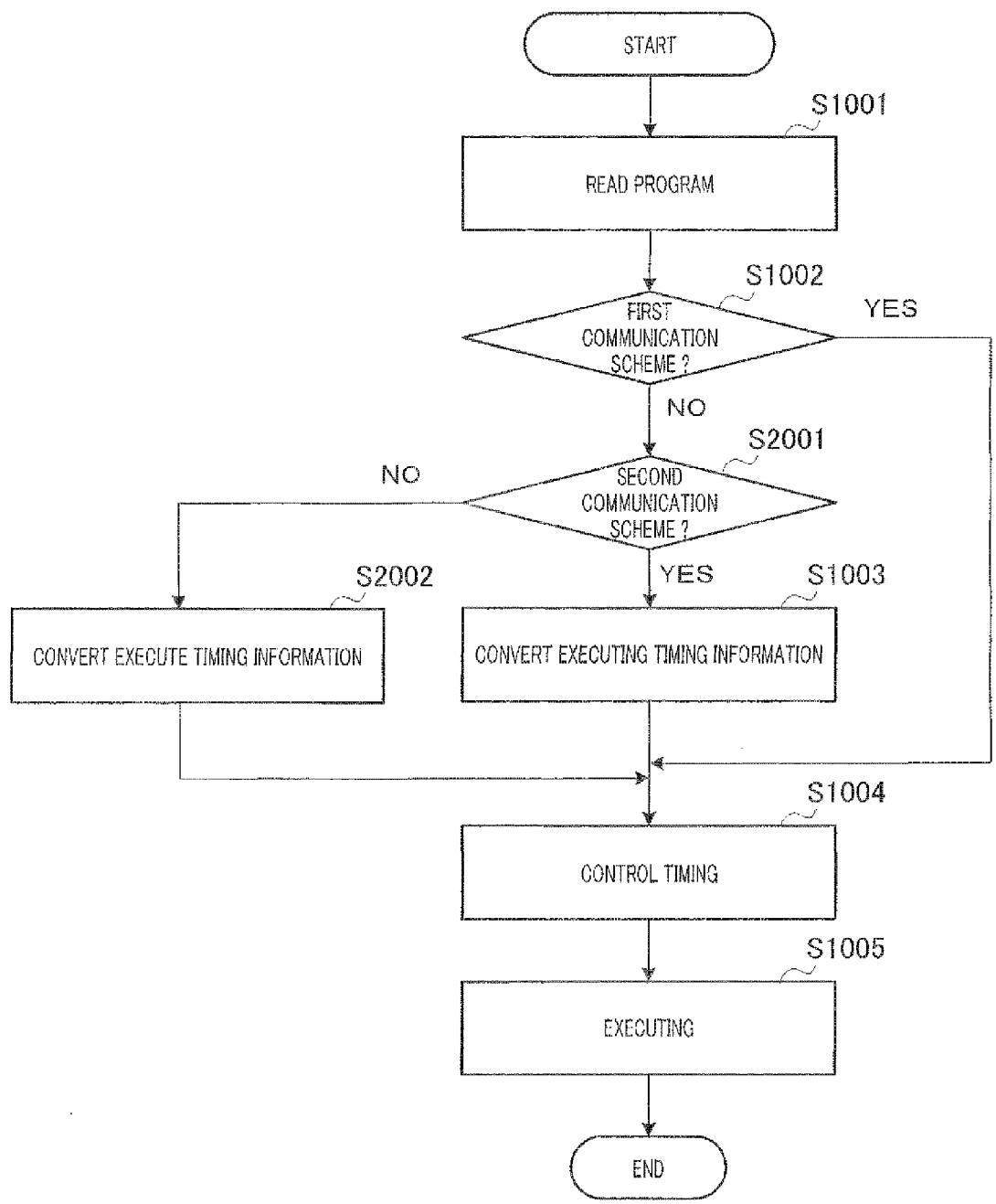
FIG. 11 is a flow diagram to explain an operations of a radio transmitting/receiving circuit according to embodiment 3 of the present invention.

FIG. 11 is a flow diagram showing an operation of radio transmitting/receiving circuit 103 according to embodiment 3.

In step S2001, program decoder 125 determines whether or not the communication scheme applied to a radio transmitting/receiving section is the second communication scheme.

As a result of the determination in step S2001, if it is determine as the second communication scheme (step S2001: YES), as in embodiment 1, parameters of transmission executing timing are converted to suit the second communication scheme (step S1003).

Meanwhile, as a result of determination in step S2001, if it is determined as the third communication scheme other than the second communication scheme (step S2001: NO), the parameters of transmission executing timing are converted to suit the third communication scheme (step S2002).

Next, operations of program decoder 125 will be described in further detail. Here, GSM, UMTS, and LTE are treated as examples. Thus, in this case, assume that LTE which is the first communication scheme of a high transmission rate, UMTS which is a second communication scheme, and GSM which is a third communication scheme. The operation clock frequency is, for example, 52 MHz if a communication scheme adopts LTE, 26 MHz if a communication scheme adopts UMTS, or 6.5 MHz if a communication scheme adopts GSM. The executing timing information written in the program is written to suit LTE that is the first communication scheme. A time interval from on timing of transmitting digital processing section 111 to on timing of DAC 112 and a time interval from on timing of DAC 112 to on timing of transmitting analogue processing section 113 which are defined as executing timing information here, are 9.7 usec and 58.9 usec respectively. Thus, to make possible the above time intervals when an operation clock frequency is 52 MHz, counter value 504 (hexadecimal: 1F8) and counter value 3062 (hexadecimal: BF6) are written in the program.

When reading this program, program decoder 125 determines the communication scheme that is applied to the radio transmitting/receiving section, and bit shifts the counter values when the second communication scheme is applied. Specifically, in program decoder 125, 1-bit right shift is memorized as shift information when the second communication scheme is applied. Program decoder 125 converts input counter value 504 (hexadecimal: 1F8) into counter value 252 (hexadecimal: FC) by shifting one bit to the right. When using counter value 252 in UMTS where the operation clock frequency is 26 MHz, the time interval from on timing of transmitting digital processing section 111 to ON timing of DAC 112 becomes 9.7 usec, as LTE.

FIG. 12 is a diagram to explain a bit-shifting process in program decoder 125. In FIG. 12, SH [2:0] shows a bit-shifting value, IN [8:0] shows a counter value (in this case, 504), and OUT [8:0] shows the value after bit-shifting. In the present embodiment, to change an operation clock from 52 MHz to 26 MHz, a bit-shifting circuit uses value after bit-shifting [0 1111 1100] of bit-shift value [001] as a counter value.

Meanwhile, when a third communication scheme is applied, program decoder 125 bit-shifts a counter value. Specifically, in program decoder 125, 3-bit right shift is memorized as shift information when a third communication scheme is applied. Program decoder 125 converts input counter value 504 (hexadecimal: 1F8) into counter value 63 (hexadecimal: 3F) by shifting 3 bits to the right. When using counter value 63 in GSM where the operation clock frequency is 6.5 MHz, the time interval from on timing of transmitting digital processing section 111 to on timing of DAC 112 becomes 9.7 usec, as in LTE. In the present embodiment, to change an operation clock from 52 MHz to 6.5 MHz, a bit-shifting circuit uses a value after bit-shifting [0 0011 1111] of a bit-shift value [011] as a counter value.

Here, as a method to suit the above time intervals of the first communication scheme, the second communication scheme, and the third communication scheme, the following method is also possible. Thus, this is a method of preparing in memory 118 a program (counter value 252) for the second communication scheme and a program (counter value 63) for the third communication scheme, other than a program (counter value 504) for the first communication scheme, and reading a program that suits the communication scheme applied to a radio transmitting/receiving section by timing control section 123. However, in this method, a program needs to be separately prepared for each operation clock, which makes the quantity of programs increase and the management of the programs complex.

On the other hand, the present invention can realize the same setting time in the same program regardless of a communication scheme, by changing the programmed data (by bit-shifting, for example) and changing an operation clock at the same time. Thus, in a communication device which employs multiple communication schemes, there has been a problem that, when a communication scheme simply switches a clock, configuration of software is required to be prepared for each operation clock, which makes the quantity of software increase and complex at the same time, but in the configuration of the present invention, radio transmitting/receiving circuit 130 that can reduce power consumption without making software complex is possible.

Although in the above description a case has been explained where GSM, UMTS, and LTE are as the first communication scheme, the second communication scheme, and the third communication scheme, the present invention is not limited to this, and it is possible to apply to other combination.

In embodiments 1-3, a case has been described as examples where two communication schemes are applied or where three communication schemes are applied, the present invention is not limited to this, and it is possible to realize a case where more than four communication schemes are applied and to achieve the same effect.

The disclosure of Japanese Patent Application No. 2009-089902, filed on Apr. 2, 2009 including the specification, drawings and abstract, is incorporated herein by reference in its entirety.

INDUSTRIAL APPLICABILITY

A radio transmitting/receiving circuit, radio communication apparatus, and radio transmitting/receiving method of the present invention is useful to reduce power consumption without complicating software when multiple communication schemes are applied.

REFERENCE SIGNS LIST

100 Radio Communication Apparatus
101 Baseband Process Circuit
102, 118 Memory
103 Radio Transmitting/Receiving Circuit
104 Power Amplifier
105 Antenna
106 Oscillator
111 Transmitting Digital Processing Section
112 Digital-To-Analog Conversion Section
113 Transmitting Analogue Processing Section
114 Receiving Analogue Processing Section
115 Analog-To-Digital Conversion Section
116 Receiving Digital Processing Section
117 Control Section
121 Sequencer
122 Clock Control Section
123 Timing Control Section
124 Program Counter
125 Program Decoder
126 Register Map
201 Information Conversion Section
202 Bit-Shifting Circuit
203 Adding Process Section

The invention claimed is:

1. A radio transmitting/receiving circuit that is formed to be able to transmit and receive in a plurality of communication schemes, and transmits and receives a radio signal using one transmitting/receiving program that is common among the plurality of communication schemes, the circuit comprising:
a radio transmitting/receiving section; and
a control section comprising:
a clock control section that switches a clock frequency according to a communication scheme applied to the radio transmitting/receiving section;
an adjustment section that adjusts information, the information defining executing timing at which an execution of the transmitting/receiving program of the radio transmitting/receiving section starts and the information being included in the transmitting/receiving program, according to the communication scheme applied to the radio transmitting/receiving section; and
a timing control section that controls executing timing of the transmitting/receiving program based on the switched clock frequency and the information about the adjusted executing timing.

2. The radio transmitting/receiving circuit according to claim 1, wherein:
the information defining the executing timing includes a first bit stream showing on timing of the radio transmitting/receiving section according to a first communication scheme; and
when a second communication scheme different from the first communication scheme is applied to the radio transmitting/receiving section, the adjustment section adjusts the executing timing of transmitting/receiving program by using a second bit stream that is generated by bit-shifting the first bit stream for M bits, M being a positive integer.

3. The radio transmitting/receiving circuit according to claim 2, wherein, when the second communication scheme is applied to the radio transmitting/receiving section, the adjustment section adjusts the executing timing of transmitting/receiving program by the second bit stream and a third bit stream acquired by adding the second bit stream generated by bit-shifting the first bit stream for N bits, N being a different positive integer from M.

4. The radio transmitting/receiving circuit according to claim 2, wherein, when the second communication scheme is applied to the radio transmitting/receiving section, the adjustment section generates a plurality of bit streams generated by bit-shifting the first bit stream for a plurality of bits, and adjusts the executing timing of transmitting/receiving program by using a bit stream acquired by adding the plurality of bit streams.

5. The radio transmitting/receiving circuit according to claim 2, wherein, when a third communication scheme different from the first communication scheme and the second communication scheme is applied, the adjustment section bit-shifts the first bit stream by a shift value that is different from when the second communication scheme is applied.

6. A radio communication apparatus comprising:
a radio transmitting/receiving circuit according to claim 1; and
a baseband process circuit that outputs a transmitting baseband signal to the radio transmitting/receiving circuit and receives a receiving baseband signal from the radio transmitting/receiving circuit.

7. A radio transmitting/receiving method to transmit and receive a radio signal using one transmitting/receiving program that is common among a plurality of communication schemes, the method comprising:
switching a clock frequency according to a communication scheme applied to a radio transmitting/receiving section;
adjusting information, the information defining executing timing at which an execution of the transmitting/receiving program of the radio transmitting/receiving section starts and the information being included in the transmitting/receiving program, according to the communication scheme applied to the radio transmitting/receiving section; and
controlling the executing timing of the transmitting/receiving program based on the switched clock frequency and the information about the adjusted executing timing.

8. The radio transmitting/receiving method according to claim 7, wherein:
the information defining the executing timing includes a first bit stream showing on timing of the radio transmitting/receiving section according to a first communication scheme;
when a second communication scheme different from a first communication scheme is applied to the radio transmitting/receiving section, the executing timing is adjusted by using a second bit stream generated by bit-shifting the first bit stream for M bits, M being a positive integer.

9. The radio transmitting/receiving method according to claim 8, wherein, when the second communication scheme is applied to the radio transmitting/receiving section, the executing timing is adjusted by using the second bit stream and a third bit stream acquired by adding the second bit stream generated by bit-shifting the first bit stream for N bits, N being a different positive integer from M.

10. The radio transmitting/receiving method according to claim 8, wherein, when the second communication scheme is applied to the radio transmitting/receiving section, the adjustment of executing timing generates a plurality of bit streams generated by bit-shifting the first bit stream for a plurality of bits, and adjusts the executing timing of transmitting/receiving program by using a bit stream acquired by adding a plurality of bit streams.

11. The radio transmitting/receiving method according to claim 8, wherein, when a third communication scheme different from the first communication scheme and the second communication scheme is applied, the adjustment of executing timing bit-shifts the first bit stream by a shift value that is different from when the second communication scheme is applied.

* * * * *